US005770841A

United States Patent [19]

Moed et al.

[11] Patent Number: 5,770,841

[45] Date of Patent: Jun. 23, 1998

[54] SYSTEM AND METHOD FOR READING PACKAGE INFORMATION

[75] Inventors: Michael C. Moed, Roswell, Ga.; Johannes A. S. Bjorner, Woodbury, Conn.

[73] Assignee: United Parcel Service of America, Inc., Atlanta, Ga.

[21] Appl. No.: 536,865

[22] Filed: Sep. 29, 1995

[51] Int. Cl.[6] .................... G06K 7/10

[52] U.S. Cl. .................... 235/375; 235/454

[58] Field of Search .................... 235/375, 454

[56] References Cited

U.S. PATENT DOCUMENTS

| | | | |
|---|---|---|---|
| 3,949,363 | 4/1976 | Holm . | |
| 4,403,339 | 9/1983 | Wevelsiep et al. | 382/44 |
| 4,411,016 | 10/1983 | Wakeland | 382/62 |
| 4,516,265 | 5/1985 | Kizu et al. | 382/48 |
| 4,776,464 | 10/1988 | Miller et al. | 209/3.3 |
| 4,832,204 | 5/1989 | Handy et al. | 209/3.3 |
| 4,921,107 | 5/1990 | Hofer | 209/546 |
| 5,031,223 | 7/1991 | Rosenbaum et al. | 382/1 |
| 5,120,940 | 6/1992 | Willsie | 235/462 |
| 5,124,692 | 6/1992 | Sasson | 340/727 |
| 5,189,292 | 2/1993 | Batterman et al. | 235/494 |
| 5,307,423 | 4/1994 | Gupta et al. | 382/11 |
| 5,308,960 | 5/1994 | Smith et al. | 235/454 |
| 5,311,999 | 5/1994 | Malow et al. | 209/583 |
| 5,327,171 | 7/1994 | Smith et al. | 348/223 |
| 5,387,783 | 2/1995 | Mihm et al. | 235/375 |
| 5,420,403 | 5/1995 | Allum et al. | 235/375 |
| 5,478,990 | 12/1995 | Montanari | 235/375 |

FOREIGN PATENT DOCUMENTS

| | | |
|---|---|---|
| 0 647 479 A2 | 12/1994 | European Pat. Off. . |
| 0 647 479 A3 | 12/1994 | European Pat. Off. . |
| 39 42 932 A1 | 6/1991 | Germany . |

*Primary Examiner*—Harold Pitts
*Attorney, Agent, or Firm*—Jones & Askew, LLP

[57] ABSTRACT

A system for reading package information includes an imaging system and a label decoding system. The imaging system captures an image of a package surface that includes a machine readable code such as a bar code and an alphanumeric destination address. The label decoding system locates and decodes the machine readable code and uses OCR techniques to read the destination address. The destination address is validated by comparing the decoded address to a database of valid addresses. If the decoded address is invalid, an image of the destination address is displayed on a workstation and an operator enters the correct address. The system forms a unified package record by combining the decoded bar code data and the correct destination address data. The unified package record is used for subsequently sorting and tracking the package and is stored in a database and applied to a label that is affixed to the package.

10 Claims, 5 Drawing Sheets

Main Flow

Image Processing Subsystem

SYSTEM AND METHOD FOR READING PACKAGE INFORMATION

TECHNICAL FIELD

The present invention relates to package tracking systems, and more particularly relates to systems for automatically reading and decoding package information such as machine readable codes and alphanumeric destination information.

BACKGROUND OF THE INVENTION

Small package delivery companies such as the assignee of the present invention may handle as many as several million packages each day. In order to improve the efficiency and accuracy with which this volume of packages is handled, these companies increasingly rely on automated package sorting and routing facilities. Small package delivery companies also desire to obtain package related information in order to better manage their operations and to provide a variety of shipping related information to their customers.

The process of sorting and tracking packages as they proceed through a package transportation system requires that each package bear two types of information. First, each package must provide a destination address. Second, each package must include a tracking number that uniquely identifies it from other packages in the system.

The destination address is required in order for the package delivery company to know where the package is going. The destination address, which includes alphanumeric text, is typically written on the package or printed on a label that is affixed to the package. For addresses in the United States, the destination address includes a street address, city, state and zip code.

The tracking number, which consists of a series of alphanumeric characters, uniquely identifies each package in the package transportation system. In most cases, the tracking number is affixed to the package in the form of a machine readable code or symbol such as a bar code. The machine readable code is read by electronic code readers at various points in the transportation system. This allows the package delivery company to monitor the movement of each package through its system and to provide customers with information pertaining to the status and location of each package.

The importance of collecting package related data has led to the development of a variety of devices for reading bar codes and other machine readable codes. These devices include hand held readers used by employees when they pick up or deliver packages, and over-the-belt cameras that are mounted over conveyor belts in order to read machine readable codes as the packages move through the delivery company's terminal facilities.

In some cases, shippers may also print and affix labels including two-dimensional machine readable codes that include both package identification information and destination address information. These dense codes are read by over-the-belt cameras and the information is used to track and sort the package. However, for packages that enter the delivery company's system without such labels, there is no efficient, automatic way to prepare such labels and affix them to packages.

Optical character recognition (OCR) technology has also improved to the point where it is feasible to automatically read and decode printed destination address data. The assignee of the present invention has developed over-the-belt camera systems that can be used to capture and decode bar codes and text as packages travel beneath the camera on a conveyor belt. The ability to read and decode destination address data is useful because it facilitates automatic sorting and routing of packages in the delivery system.

Although OCR systems are becoming more common, there are often difficulties associated with decoding data from packages moving on a conveyor belt at a high rate of speed. Current bar code decoding techniques provide for using a variety of algorithms for scanning an image and locating and decoding a bar code. These techniques are very accurate, in part because of the use of checksums and other techniques to ensure the reliability of the bar code decoding process. OCR techniques typically apply a variety of decode algorithms to a string of text in order to accurately decode the text. However, there remains the possibility that the address data may be improperly decoded. Furthermore, it is difficult to detect an improperly decoded address because OCR decoding does not employ checksums and other techniques that are available to verify the accuracy of machine readable codes.

Therefore, there is a need in the art for a system that reads and decodes bar codes and text, and which verifies the accuracy of the destination address data. Furthermore, there is a need for a system that provides a method for correcting improperly decoded destination address data, and for combining the destination address data and the decoded bar code data to form a unified package record, which may be used to track and sort the package as it moves through the package delivery system.

SUMMARY OF THE INVENTION

The present invention satisfies the above-described need by providing a system and method for reading package information. In the system of the present invention, a package bears at least one label that includes information indicia such as a destination address and a machine readable symbol (for example, a bar code or two-dimensional dense code) bearing a package identification number. As packages move along a conveyor belt, an image of each package is captured and the indicia are decoded. The decoded destination address is validated by checking a database of valid addresses. If the decoded address is invalid, an image of the address is displayed on an image display workstation, and an operator enters the correct destination address. The symbol data and destination address are combined to form a unified package record, which may be used to sort and track the package. The unified package record may be stored in a database or printed on a label and affixed to the package.

Generally described, the present invention provides a method for reading package information from a package that includes first and second information indicia. The method includes capturing an image of the package. The captured image includes the first information indicia and the second information indicia. The first information indicia is located and decoded to provide first package data. The second information indicia is located and decoded to provide second package data. The first and second package data are then combined to form a unified package record. The unified package record may be stored in a database or printed on a label and affixed to the package.

In another aspect, the present invention provides a method for reading and verifying package information from a package. The method includes capturing an image of the package, which includes information indicia. The information indicia is located and decoded to provide first package data. The first package data is verified to determine whether it is valid. If not, the image of the information indicia is displayed on a workstation. Manually entered first package data is then received from an operator at the workstation.

In yet another aspect, the present invention provides a system for reading package information from a package, which includes first and second information indicia. The system includes an imaging system with a camera for capturing an image of the package, and a label decoding system for processing the image. A printer is provided for printing a label to be affixed to the package. The label decoding system is programmed to locate and decode the first information indicia in the image, thereby providing first package data. The label decoding system also locates and decodes the second information indicia in order to provide second package data. The first and second package data are combined to form a unified package record, which may be printed by the label printer.

More particularly described, the label decoding system of the present invention includes an image display workstation. The system is operative to determine whether the second package data is valid and, if not, display the image on a workstation. The system receives manually entered second package data from the workstation, and forms the unified package record from the first package data and the manually entered second package data.

It is therefore an object of the present invention to provide a system that reads and decodes all relevant package data from a package.

It is another object of the present invention to verify the accuracy of the decoded package data.

It is another object of the present invention to facilitate the correction of incorrectly decoded package data.

It is another object of the present invention to provide a unified package record including relevant package data.

DETAILED DESCRIPTION OF THE PREFERRED EMBODIMENT

Figure 1:
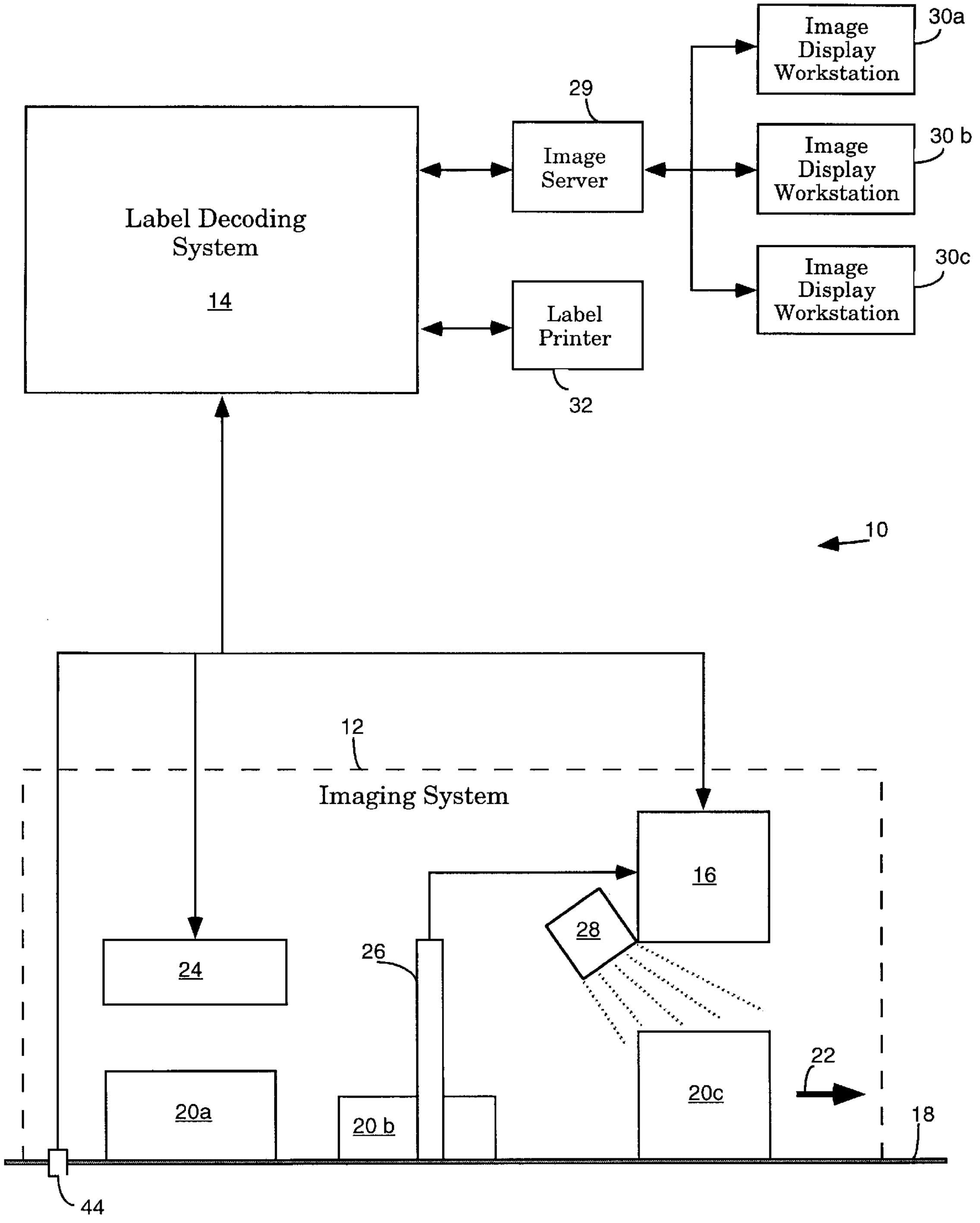
FIG. 1 is a block diagram of a system for reading package information in accordance with the present invention.

The present invention provides a novel system and method for reading package information. Generally described, the system includes an imaging system that provides a digital image of a surface of a package that is moving on a conveyor belt. The image includes a bar code and destination address that are provided on the package surface. A label decoding system processes the image from the imaging system and decodes the bar code and the destination address data. The destination address data is validated by checking the address against the United States Postal Service's ZIP+4 database, which contains all of the valid addresses in the United States. If the destination address was decoded incorrectly, the portion of the image that includes the destination address is displayed on an image display workstation, along with a list of possible addresses from the database. An operator reads the destination address data from the display and manually enters it into the computer terminal or selects the correct address from a displayed list of possible addresses. After the destination address has been validated or manually entered, the bar code data and destination address data are combined to form a unified package record, which provides efficient means for automatically tracking and sorting packages. This data may be stored in a database or printed on labels and affixed to the package.

Before describing the present invention in additional detail, it is useful to discuss the nomenclature of the specification. Portions of the detailed description that follows are represented largely in terms of processes and symbolic representations of operations performed by computer components, including a central processing unit (CPU), memory storage devices for the CPU, and connected display devices. These operations include the manipulation of data by the CPU and the maintenance of these data within data structures resident in one or more of the memory storage devices. The symbolic representations are the means used by those skilled in the art of computer programming and computer construction to most effectively convey teachings and discoveries to others skilled in the art.

For the purposes of this discussion, a process or portions thereof may be generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. In most cases, it will be apparent that these steps are performed by a computer without requiring input from an operator. In some cases, the operations described herein are machine operations performed in conjunction with a human operator that interacts with the computer. The machines used for performing the operation of the present invention include general purpose digital computers or other similar computing devices.

In addition, it should be understood that no particular programming language is provided, and that the programs, processes, methods, etc. described herein are not limited to any particular computer or apparatus Those skilled in the art will appreciate that there are many computers and operating systems which may be used in practicing the instant invention and therefore no detailed computer program could be provided which would be applicable to these many different systems. Each user of a particular computer or operating system will be aware of the program modules and tools that are most appropriate for that user's needs and purposes.

Referring now the drawings, in which like numerals represent like elements throughout the several figures, the present invention will be described.

THE SYSTEM FOR READING PACKAGE INFORMATION

FIG. 1 illustrates a system 10 for reading and decoding package information as packages travel on a conveyor belt. The system 10 includes an imaging system 12 and a label decoding system 14. Generally described, the preferred imaging system 12 is a two-camera system that includes a high resolution over-the-belt (OTB) camera 16 and a fiduciary mark detector 24, which includes the second camera. The high resolution OTB camera 16 and fiduciary mark detector 24 are mounted above a conveyor belt 18 that carries packages 20*a–c* in the direction of arrow 22. Together, the high resolution OTB camera 16 and fiduciary mark detector 24 ascertain the position and orientation of a fluorescent ink fiduciary mark located within a destination address block on the surface of a package, capture an image of the top surface of the package, and provide the image and the location and orientation of the fiduciary mark to the label decoding system 14. The label decoding system 14 includes general purpose and high performance computers and data storage facilities. The label decoding system 14 is connected to an image server 29, which is connected to at least one image display workstation 30*a–c*, and to a label printer 32. The label decoding system 14 locates and decodes machine readable package identification data (e.g., a bar code) and destination address data contained in the image. This package identification data and destination address data are combined to form a unified package record, which may be stored in a database or printed in machine readable form on a label and affixed to the package.

Figure 2:
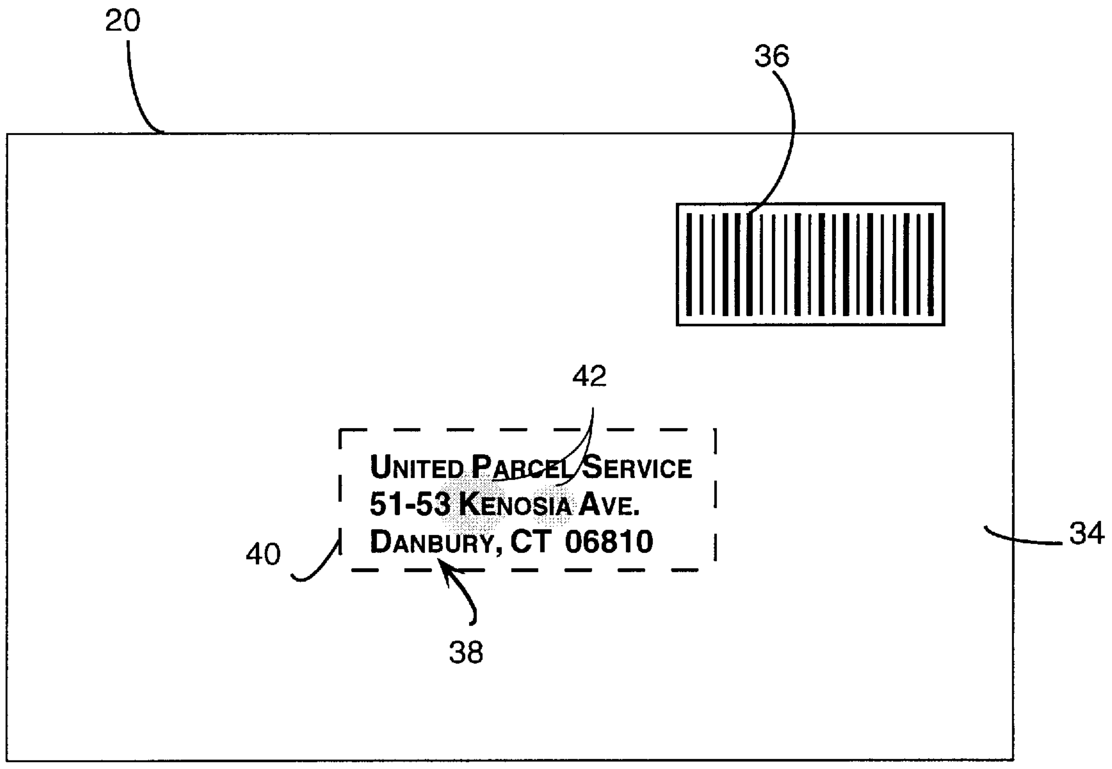
FIG. 2 is a diagram of a parcel including a fluorescent ink fiduciary mark located within the destination address block of the parcel.

FIG. 2 illustrates the top surface 34 of a package 20 that is processed by the preferred system 10. The top surface 34 of each package 20 includes package tracking information in the form of a machine readable code or symbol such as a bar code 36. The package tracking information represented by the bar code uniquely identifies the package and distinguishes it from the other packages in the delivery system. The top surface of the package also includes a destination address 38, which typically consists of alphanumeric text arranged in two or more lines. The destination address 38 is located in an area referred to as the destination address block 40. A fiduciary mark such as fluorescent ink fiduciary mark 42 is located approximately in the center of the destination address block 40 in the same area as the text defining the destination address. The fiduciary mark 42 is applied to the destination address block 40 by the shipper or by an agent of the small package delivery company. This may be accomplished by using a rubber stamp in the shape of the desired fiduciary mark to apply fluorescent ink to the package surface. Those skilled in the art will appreciate that other types of fiduciary marks may be used.

Referring again to FIG. 1, the components and operation of the imaging system 12 and the label decoding system 14 will be described in additional detail. In addition to the high resolution OTB camera 16 and fiduciary mark detector 24, the imaging system 12 includes a package height sensor 26, and an illumination source 28. As packages are transported by the conveyor belt 18 the packages 20*a–c* first pass under the fiduciary mark detector 24, which detects a fiduciary mark in order to determine the location and orientation of the destination address block. The package height sensor 26 is a commercially available light curtain, and is used to determined the height of the package before it passes beneath the high resolution OTB camera 16. The height information from the height sensor 26 is used by the high resolution camera's focusing system. This permits the high resolution camera 16 to accurately focus on the top surface of the package 20*c* as it moves beneath the camera. The illumination source 28 illuminates the top surface of the package 20*c* as it passes beneath the high resolution camera 16. The location and orientation information are provided to the label decoding system 14 along with the image from the high resolution camera 16.

The conveyor belt system is used to transport packages through a terminal facility. In the preferred system 10, the conveyor belt 18 is 16 inches wide and carries up to 3,600 packages per hour while moving at a rate of up to 100 feet per minute. The packages 20*a–c* vary in height and may be arbitrarily oriented on the conveyor belt 18. The conveyor belt 18 moves each package beneath the fiduciary mark detector 24 and high resolution camera 16 in single file, and with some amount of space between them. The packages are separated by a device known as a singulator. A suitable singulator is described in U.S. Pat. No. 5,372,238 to Bonnet, entitled "Method and Apparatus for Singularizing Objects."

The conveyor belt 18 includes a belt encoder 44 that is used to determine the speed and position the associated conveyor belt. Those skilled in the art will appreciate that the speed and position of the conveyor are needed in order to synchronize the position of the fiduciary mark, the package height information, and the position of the package as it passes beneath the high resolution camera 16. The belt encoder supplies a signal indicating the speed of the conveyor 18 to the fiduciary mark detector 24 and the high resolution camera 16. The signal from the encoder is used to produce a line clock signal that is used to trigger cycles of the fiduciary mark detector's low resolution camera (i.e., exposures of the line of CCD pixels comprising the low resolution camera). Each cycle captures a row of the image of the surface of a parcel as it moves past the fiduciary mark detector 24. The belt encoder 44 is selected to provide a pulse for each cycle of the high resolution camera 16. Those skilled in the art will appreciate that the signal from the encoder allows the line images captured by the fiduciary mark detector 24 and high resolution camera 16 to be assembled by the label decoding system 14 into two-dimensional images with the correct aspect ratios. A more detailed description of the interaction between an OTB camera, conveyor belt, height information processor, and belt encoder is provided in U.S. Pat. No. 5,291,564 to Shah, entitled "System and Method for Acquiring an Optical Target," which is incorporated herein by reference.

A suitable fiduciary mark detector is described in pending U.S. application Ser. No. 08/419,176, filed Apr. 10, 1995, and entitled "Method for Locating the Position and Orientation of a Fiduciary Mark," which is assigned to the assignee of the present invention and is incorporated herein by reference. The fiduciary mark detector 24 includes a low resolution CCD camera, a video processor, and an ultraviolet light source for illuminating the fluorescent ink that forms the fiduciary mark. The conveyor belt 18 moves a package 20*a* through the field of view of the low resolution CCD camera. The video processor controls the operation of the low resolution camera and sequentially transmits a one-bit (i.e., black/white) video signal corresponding to the image captured by the low resolution camera to the label decoding system 14. The preferred low resolution camera is a low resolution, monochrome, 256 pixel line-scan type camera such as a Thompson TH7806A or TH7931D. The ultraviolet light source illuminates the package 20*a* as it is conveyed through the viewing area of the low resolution camera, which captures an image of the surface of the package 20*a*. The low resolution camera is fitted with a commercially available optical filter that transmits yellow/green light such as that emitted by fluorescent ink exposed to ultraviolet light and attenuates light in other portions of the visible spectrum. The low resolution camera is thus configured to be responsive to the yellow/green light emitted by the illuminated fiduciary mark, and not to the other indicia found on the package surface. More specifically, the optical filter causes the low resolution camera to be responsive to the yellow/green light emitted from the commercially available National Ink No. 35-48-J (Fluorescent Yellow) in response to ultraviolet light.

Referring again to FIG. 2, the preferred fiduciary mark 42 will be described in additional detail. The preferred fiduciary mark 42 comprises two fluorescent non-overlapping circles of different diameter. As used herein, a circle means either an annulus or the area bounded by an annulus. The fiduciary mark 42 includes a large circle and a small circle oriented such that a vector from the center of large circle to the center of the small circle is oriented approximately in the same direction as underlying text of the destination address 38. The position of the fiduciary mark 42 is defined to be the mid-point of the vector. It will be clear to those skilled in the art that alternative embodiments might include locating the fiduciary mark elsewhere on the parcel in a known relation to a text bearing area, or in a different known relationship to the underlying text. The fiduciary mark 42 is typically applied to a parcel using a conventional rubber stamp and fluorescent ink after the destination address 38 has been affixed to the parcel. It will be appreciated that the fiduciary mark 42 might be carried on a label, preprinted upon the parcel, or might be carried upon a transparent envelope into which an address label is placed.

For the preferred fiduciary mark 42, the diameter of the large circle is approximately ¾ of an inch, the diameter of the small circle is approximately 7/16 of an inch, and the distance separating them is approximately ¼ of an inch. It is noted that a limit is imposed upon the size of the fiduciary mark 42 by the resolution of the low resolution camera that forms a part of the fiduciary mark detector 24. For example, the fiduciary mark 42 may be made smaller if the low resolution camera has a higher resolution, and the resolution of camera may be reduced if the fiduciary mark is made larger.

Those skilled in the art will appreciate that a fiduciary mark can be any mark that identifies the location of the destination address and that the preferred fiduciary mark comprising two circles is simply one of a variety of possible choices. Those skilled in the art will also appreciate that although the preferred fiduciary mark indicates the location and orientation of the destination address it is possible to use a fiduciary mark that indicates only location. In such a case, the orientation would be determined by applying an appropriate processing technique to the image of the destination address block.

The preferred system 10 also defines a region of interest defined with respect to the fiduciary mark 42. The region of interest is defined in terms of the high resolution camera to be a 1 k by 1 k square (i.e., 1,024 pixels by 1,024 pixels, which is equivalent to approximately four inches by four inches) centered on the defined position of the fiduciary mark 42. The label decoding system 14 determines the position and orientation of the fiduciary mark 42 and defines the region of interest with respect to the position of the fiduciary mark 42. The label decoding system then creates and stores a high resolution text image within the region of interest from the data captured by the high resolution camera 16. In this manner, only a relatively small portion of the data captured by the high resolution camera 16 is processed in order to decode the destination address data.

The package height sensor 26 is a commercially available light curtain, and is used to determined the height of the package before it passes beneath the high resolution OTB camera 16. The height information from the height sensor 26 is used by the high resolution camera's focusing system.

The preferred illumination source 28 includes an unsymmetrical elliptical reflector. The reflector is shaped by first and second elliptical surfaces. The first and second elliptical surfaces share a common first focus, along which the light source is located. The first and second elliptical surfaces have different second foci. Thus, half of the elliptical surface concentrates the light at one level and the other half concentrates the light at a second level. Together, the first and second elliptical surfaces develop intense illumination between their respective second focal axes.

The high resolution camera 16 is preferably a monochrome, 4,096 pixel line-scan type camera such as one using a Kodak KLI-5001 CCD chip. Each pixel measures approximately 7 microns×7 microns. The CCD array is sufficiently wide to scan the entire width of the conveyor belt. The image of the package is captured one "slice" at a time as the package moves beneath the camera. The high resolution camera 16 transmits an eight-bit gray-scale video signal corresponding to the captured image to the label decoding system 14. Illumination source 28 provides bright white light in order to illuminate the package as it is conveyed through the viewing area of the high resolution camera 16, which captures an image of the surface of a package. The high resolution camera 16 is responsive to a grayscale light pattern such as that reflected by black ink text on the surface of the package 20*c*. The high resolution camera 16 is relatively unresponsive to light such as that reflected by fluorescent ink when illuminated by white light. More specifically, the commercially available National Ink No. 35-48-J (Fluorescent Yellow) is substantially invisible to the high resolution camera 16 when illuminated by the white light source 28.

Suitable high resolution camera systems are described in U.S. Pat. Nos. 5,327,171 to Smith et al., entitled "Camera System Optics" ("the '171 patent"), and 5,308,960 to Smith et al., entitled "Combined Camera System," and in allowed U.S. application Ser. No. 08/292,400, filed Aug. 18, 1994, entitled "Optical Path Equalizer" ("the Optical Path Equalizer application"), all of which are assigned to the assignee of the present invention and incorporated herein by reference.

The '171 patent describes an OTB camera system for capturing images of packages as they move beneath the camera on a conveyor belt. The system described in the '171 patent includes an illumination source, a belt encoder for determining the speed and position of the conveyor belt, and a processing subsystem that searches for a number of different acquisition targets.

The Optical Path Equalizer application describes an OTB camera with an optical system that equalizes the path between the OTB camera and the package located beneath the camera. This allows the camera to accurately focus on the package surface regardless of the package's height, and also maintains an approximately constant image size regardless of the height of the package. The optics assembly includes a pair of movable mirrors and an array of fixed mirrors. The movable mirror are mounted on pivot pins and are rotated by one or more actuators. The array of fixed mirrors includes a plurality of mirrors positioned at increasing distances from the movable mirrors as to provide a plurality of different optical path lengths between the camera and the package surface. The Optical Path Equalizer application also describes the use of a height sensing device such as a commercially available light curtain. The data from the height sensing device is used to determine the optical path length of the variable optical subsystem.

The label decoding system 14 processes the data provided by the imaging system 12. The label decoding system 14 includes input/output devices for receiving data from the fiduciary mark detector 24 and the high resolution camera 16. The label decoding system includes both general purpose computers and high performance computers. The high performance computers, such as Adaptive Solutions CNAPS processor and Imaging Technologies 150/40 processor, are used to run that OCR algorithms that are used to decode the alphanumeric destination address data. The general purpose computers, such as Heurikon Nitro 60 and Heurikon HKV4D computers, are used to process the location and orientation data from the fiduciary mark detector 24 and to decode detect and decode the bar code that includes the package tracking information. The label decoding system includes storage devices such as memory, disk drives and tape drives. The label decoding system may also be connected to other computing equipment that is used for package tracking, billing, etc.

The label decoding system 14 is connected to a image server 29, which is connected to a network that includes a plurality of image display workstations 30*a–c*. If the label decoding system is unable to verify a decoded destination address by reference to the U.S. Postal Service's ZIP+4 database, the system 10 displays the destination address image on one of the image display workstations 30*a–c*, where it is viewed by an operator. The displayed destination address image is accompanied by the closest addresses from the database. The operator than reads the address on the display and manually enters the correct address or selects the correct address from the list of the closest addresses. Thus, the image display workstation must include a display, a processor, input means such as a keyboard, and input/output means for communication data to and from the label decoding system. The preferred image display workstations 30*a–c* are IBM compatible personal computers based on Intel Corporation's PENTIUM processor and running Microsoft Corporation's WINDOWS NT operating system. Those skilled in the art will appreciate that the image display workstations may include any computer imaging system or other computer image processor capable of receiving and processing pixel images and other information at high rates of speed, and that the number of such image display workstations used in a facility will depend on the volume of packages moving through the system and various other factors. Those skilled in the art will also appreciate that the image server 29 may be any computer or network server capable of being connected to the image display workstations and capable of transferring and processing pixel images at high rates of speed.

The label decoding system is also connected to at least one label printer 32. As mentioned briefly above, the decoded package identification information and destination address are combined to form a unified package record, which may be used to facilitate the track and sorting of the package throughout the delivery system. While the unified package record may be stored in a database, it may also be printed on a label and automatically affixed to the package as it travels on the conveyor belt. The preferred label printer 32 is an automatic label applicator, manufactured by Accusort. In the preferred system 10, the unified package record is printed in machine readable dense code, such as the codes described in U.S. Pat. No. 4,896,029 to Chandler et al., entitled "Polygonal Information Encoding Article, Process and System" and U.S. Pat. No. 4,874,936 to Chandler et al., entitled "Hexagonal, Information Encoding Article, Process and System." Those skilled in the art will appreciate that the number of label printers will depend on the configuration of the conveyor system, the number of packages moving through the system, and other factors.

THE PREFERRED METHOD FOR READING PACKAGE INFORMATION

The preferred method for reading package information will now be discussed in conjunction with FIGS. 3–5. As described above, the system 10 is operative for capturing an image of a package as it travels on a conveyor belt, and detecting and decoding a bar code and OCR address data that appear on the package. The OCR data is validated and, if not accurate, is displayed on a terminal where an operator can manually enter the address data. The decoded bar code data and address data are combined to form a unified package record, which is subsequently used to sort and track the package.

Figure 3:
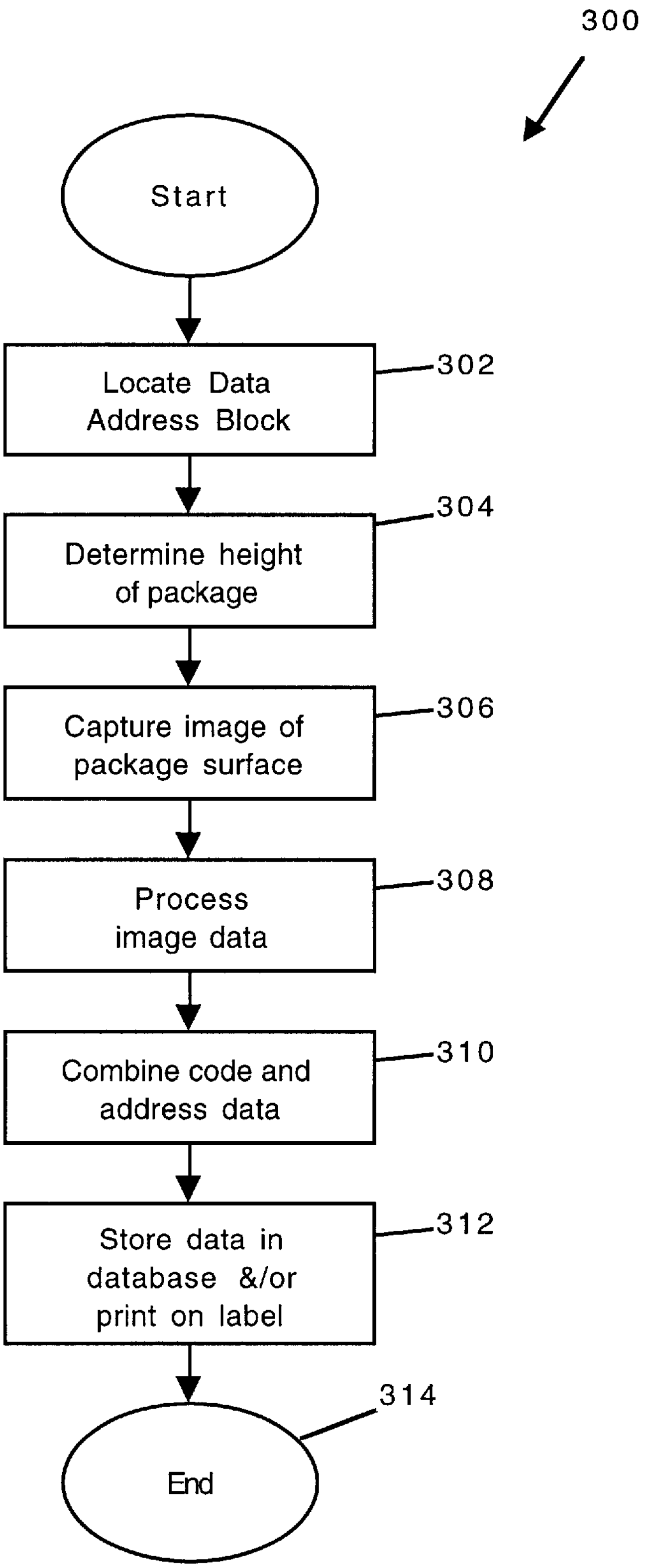
FIG. 3 is a flow diagram of the process for reading package information carried out by the system of FIG. 1.

FIG. 3 is a flow diagram illustrating the preferred method 300 for reading package information. The steps that form the method 300 are carried out by the various equipment that forms a part of the system 10 for reading package information. The method 300 begins at step 302 by determining the location and orientation of the destination address block. In the preferred system, this is accomplished as the package moves beneath the fiduciary mark detector 24, which is described above in conjunction with FIGS. 1 and 2. The coordinate and orientation information from the fiduciary mark detector are provided to the label decoding system 14, where they are used to process the image that is provided by the high resolution camera 16.

After the package is scanned by the fiduciary mark detector, the package height is determined by the package height sensor 26 at step 304. At step 306 a high resolution image of the top of the package is captured by the high resolution OTB camera 16 as the package passes beneath the high resolution camera. This image is provided to the label decoding system 14. The high resolution camera 16 uses the package height data from the package height sensor 26 to adjust the focal length of the camera and ensure that the camera is properly focused regardless of the height of the package.

At step 308 the label decoding system 14 processes the data from the belt encoder 44, the fiduciary mark detector 24, and the high resolution camera 16. Generally described, the processing performed by the label decoding system includes locating and decoding the bar code, locating and decoding the destination address, verifying the accuracy of the destination address, and receiving a manually entered destination address if needed. The particular steps involved in processing the data are described below in conjunction with FIG. 4.

At step 310 the bar code and destination address data are combined to form a unified package record, which is stored in a database or printed on a label and affixed to the package at step 312. The data contained in the unified package record is subsequently used for sorting and tracking the package as it moves through the delivery company's system. The method 300 terminates at step 314.

Figure 4:
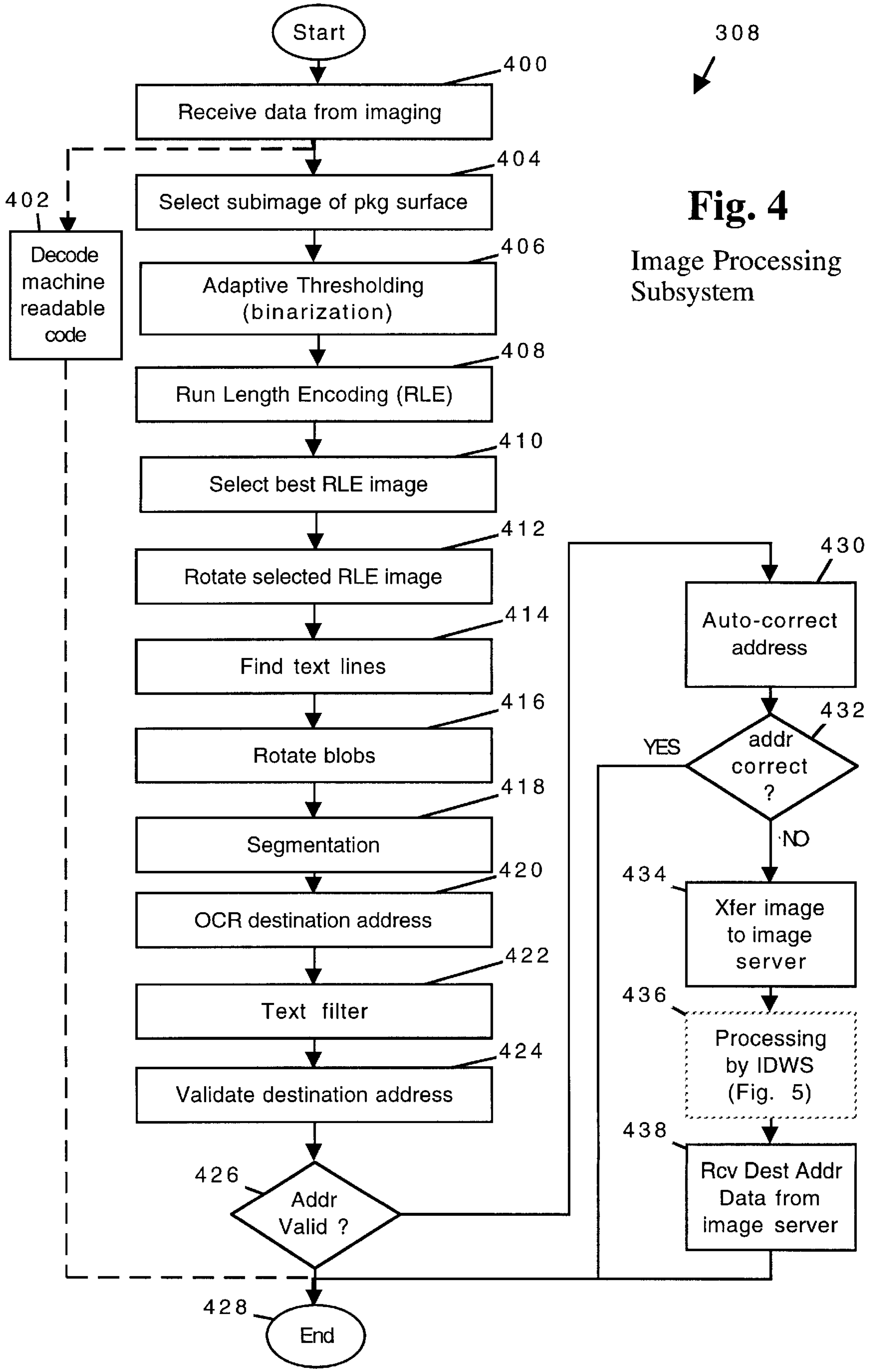
FIG. 4 is a flow diagram of the preferred method for processing image data provided by the imaging system that forms a part of the system,of FIG. 1.

FIG. 4 is a flow diagram illustrating the preferred method 308 for processing image data. This method is carried out by the label decoding system 14 and forms a part of the method 300 of FIG. 3. The method 308 begins at step 400 when the label decoding system receives the data from the belt encoder 44, the fiduciary mark detector 24 and the high resolution OTB camera 16. As described above, the high resolution camera provides an image of the top of a package. The image includes a bar code 36 and a destination address 38. The fiduciary mark detector provides data indicating the location and orientation of the destination address block 40.

At step 402 the label decoding system 14 locates and decodes the bar code 36 or other machine readable symbol, which is contained in the image provided by the high resolution camera 16. Those skilled in the art will be familiar with various systems and methods for locating and decoding bar codes. Suitable methods for locating and decoding the bar code 36 are described in U.S. Pat. No. 5,343,028 to Figarella et al., entitled "Method and Apparatus for Detecting and Decoding Bar Code Symbols Using Two-Dimensional Digital Pixel Images," U.S. Pat. No. 5,352,878 to Smith et al., entitled "Method and Apparatus for Decoding Bar Code Symbols Using Independent Bar and Space Analysis," U.S. Pat. No. 5,412,196 to Surka, entitled "Method and Apparatus for Decoding Bar Code Images Using Multi-Order Feature Vectors," and U.S. Pat. No. 5,412,197 to Smith, entitled "Method and Apparatus for Decoding Bar Code Symbols Using Gradient Signals," all of which are assigned to the assignee of the present invention and incorporated herein by reference. Those skilled in the art will appreciate that the machine readable code or symbol decoded by the label decoding system may include a bar code or a two-dimensional code.

At step 404 the method 308 begins the process of locating and decoding the destination address. Steps 404 through 422 are associated with the application of optical character recognition (OCR) techniques to the image provided by the high resolution camera 16. This process is carried out in parallel with decoding the bar code (step 402).

At step 404 the label decoding system selects a subimage of the package surface from the image provide by the high resolution camera 16. In the preferred system, this subimage is referred to as a region of interest (ROI), which is defined with respect to the fiduciary mark 42. In terms of the image from the high resolution camera, the region of interest is a 1 k by 1 k square (i.e., 1,024 pixels by 1,024 pixels, which is equivalent to approximately four inches by four inches) centered on the defined position of the fiduciary mark 42. The label decoding system 14 determines the position and orientation of the fiduciary mark 42 and uses that information to define the region of interest with respect to the position of the fiduciary mark 42. The label decoding system then creates and stores a high resolution text image within the region of interest from the data captured by the high resolution camera 16. In this manner, only a relatively small portion of the data captured by the high resolution camera 16 is processed in order to decode the destination address data. This image is referred to as the region of interest (ROI) image.

Although the system 10 locates the destination address block using the information provided by the fiduciary mark detector 24, those skilled in the art will appreciate that software techniques may be implemented to detect the location and orientation of the destination address from the image provided by the high resolution OTB camera. Suitable techniques would eliminate the need for the fiduciary mark detector, but would require additional computing resources in the label decoding system 14 Such software techniques may be used without departing from the spirit and scope of the present invention. Furthermore, those skilled in the art will appreciate that the fiduciary mark detector described above may be replace with other apparatus for indicating and detecting the location and orientation of an indicia on a package, such as the systems described in U.S. Pat. Nos. 4,516,265 to Kizu et al. and 5,103,489 to Miette.

At step 406 the method performs adaptive thresholding on the ROI image. This technique involves binarizing the ROI image and creating three different binarized images using three different threshold values. The three threshold values are determined by measuring the contrast and relative brightness of the ROI image.

At step 408 the three images resulting from step 406 are run length encoded. At step 410 the best of the three run length encoded images is selected for further processing.

Suitable methods for carrying out steps 406, 408, 410 are described in commonly owned U.S. application Ser. No. 08/380,732, filed Jan. 31, 1995, entitled "Method and Apparatus for Separating Foreground From Background in Images Containing Text," which is incorporated herein by reference.

At step 412 the label decoding system performs a coarse rotation of the selected run length encoded image. The coarse rotation is the first of a two-step process that is designed to make the ROI image appear horizontal in order to simplify the separation of the characters. Generally described, the information derived from the fiduciary mark indicates the orientation of the destination address block and how far off of horizontal it is. The coarse rotation is the first step toward rotating the image to where the destination address appears horizontal.

The preferred method for rotating the ROI image is described in commonly owned U.S. application Ser. No. 08/507,793, filed Jul. 25, 1995, entitled "Method and System for Fast Rotation of Run-Length Encoded Images," which is incorporated herein by reference. Those skilled in the art will appreciate that he coarse rotation process is relatively quick and rotates the image to within ±7 degrees of horizontal.

At step 414 the label decoding system identifies the lines of text that are contained in the destination address block 40. his is accomplished by subsampling the image by a factor of 3 in the x and y directions, executing a connected components process that finds groups of linked pixels, and applying a Hough transform that finds line locations and orientations from the linked pixels.

Once the lines are found using the reduced resolution method, the original lines are restored to full resolution using the location information generated by the Hough transform. Another connected components analysis is applied to the full resolution lines in order to capture the text characters. Those skilled in the art will understand that connected components analysis and Hough transforms are standard image processing techniques.

Once the lines are identified, the method 308 proceeds to step 416 and performs a fine rotation on the characters included in each line of the destination address. This fine rotation completes the rotation process begun at step 412 and rotates the characters to horizontal (i.e., zero degrees). This ensures that the characters are properly oriented for the application of the OCR algorithm, which attempts to decode each character in the destination address. This step is accomplished by applying forward rotational techniques. The preferred rotational techniques are described by the following formulas:

$$x_{new}=(x_{old}*\cos\phi)+(y_{old}*\sin\phi)$$

$$y_{new}=(x_{old}*\sin\phi)-(y_{old}*\cos\phi)$$

where $\phi$ is the orientation of the destination address after the coarse rotation performed at step 412.

At step 418 the rotated characters are segmented or separated into separate characters. This is done because the OCR algorithm is applied to each character individually. At step 420 the OCR algorithm is applied to each of the characters in the destination address. Those skilled in the art will appreciate that the OCR algorithm uses a variety of techniques to recognize each characters and to determine what standard ASCII characters is represented by each character in the destination address. Those skilled in the art will also appreciate that the OCR algorithm may be used to decode other alphanumeric information on the package, such as the return address, shipper number, etc. A suitable OCR technique is described in U.S. Pat. No. 5,438,629, entitled "Method and Apparatus for Classification Using Non-spherical Neurons," which is incorporated herein by reference.

At step 422 the OCR processed text is filtered to remove any characters that are not a part of the destination address.

At step 424 the OCR processed destination address is validated or verified by attempting to match the decoded destination address with an address in the U.S. Postal Service's ZIP+4 database, which provides an exhaustive list of valid addresses in the United States. This step is necessary because the destination address and OCR algorithms do not include built in verification means such as checksums, etc.

At step 426 the method 308 determines whether the decoded destination address matched a valid address in the ZIP+4 database or other database of valid addresses. If so, the method continues to step 428 where it returns to step 310 of the method 300 (FIG. 3). Related methods for processing data in databases are described in commonly owned U.S. application Ser. No. 08/477,481, filed Jun. 7, 1995 and entitled "A Multi-Step Large Lexicon Reduction Method for OCR Application," which is incorporated herein by reference.

If the decoded address does not match a valid address in the ZIP+4 database, the method 308 proceeds to step 430 and automatically attempts to correct common OCR errors in order to automatically provide a valid address. Typical OCR errors involve incorrectly decoding letters that look similar. Therefore, step 430 is optimized to correct OCR errors by substituting such letters in an attempt to match one of the valid addresses that appears in the address database.

Those skilled in the art will understand that the validation process is tunable and involves three parameters. The accuracy rate indicates the percentage of labels that are automatically read correctly. The error rate indicates the percentage of labels that the system thinks it is has correctly, but are in fact incorrect. The rejection rate indicates the percentage of labels that are not read correctly and which must be entered manually. The OCR validation process is tuned by first determining an acceptable error rate. Once this is determined, the system is tuned by adjusting the parameter that controls the relationship between the rejection rate and the error rate.

At step 432 the method determines whether the substituted characters have resulted in a valid address. If so, the method proceeds to step 428.

If the method is unable to match correct the decoded address and match a valid address in the ZIP+4 database, the method proceeds to step 434 and transfers the image to a the image server 29, which is connected to one or more image display workstations. The image display workstations display an image of the destination address block and the closest possible addresses from the database. The image display workstation allows an operator to view the image of the destination address and manually enter the destination address into the workstation. This process (step 436) is described more completely in conjunction with FIG. 5.

At step 438 the method 308 receives the manually entered destination address data from the image server. The information returned by the image server may take the form of manually entered address data or a selected one of the possible addresses from the database. After the address data is received from the image server, the method 308 proceeds to step 428 and returns to the method 300.

Figure 5:
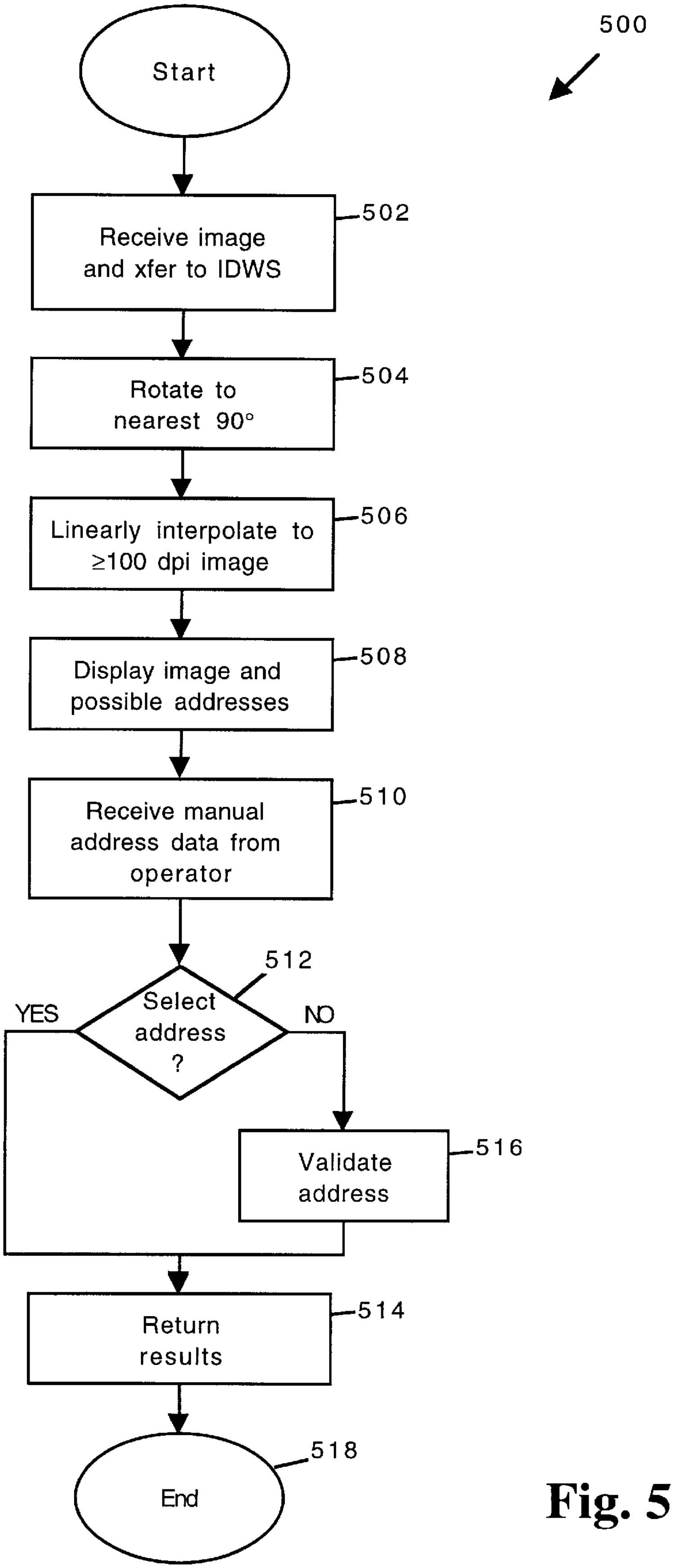
FIG. 5 is a flow diagram of the preferred method for correcting incorrectly decoded destination address data.

FIG. 5 is a flow diagram illustrating a method 500 carried out by the image server 29 and the image display workstations 30*a–c* that form a part of the preferred system 10. As described above, the image display workstations are used to allow an operator to manually enter destination addresses that were not properly matched to valid addresses in the ZIP+4 database. This is accomplished by displaying an image of the destination address and the closest possible addresses from the database. The operator reads the address as it appears on the display and manually enters the address into the workstation or selects one of the displayed addresses. This manually entered address data is then returned to the label decoding system 14 where it replaces the improperly decoded OCR data.

The method 500 begins at step 502 where the image server receives the image of the destination address from the label decoding system 14. The image server routes the image to a free image display workstation. At step 504 the image display workstation rotates the image to the nearest horizontal or vertical axis. At step 506 the rotated image is interpolated to form an image having a resolution of at least 100 dots per inch (DPI) image, which is displayed at step 508. In addition to the destination address image, the workstation also displays the closest possible matches from the ZIP+4 database.

At step 510 the operator manually enters the destination address after having read the destination address presented on the display. The operator manually enters the correct destination address by selecting the correct address from the closest possible matches (if the correct address is displayed) or entering the address using a keyboard associated with the image display workstation.

At step 512 the method determines whether the destination address data entered by the operator was selected from the list of possible addresses selected from the database. If so, the method proceeds to step 514 and returns the correct destination address to the image server 29, which returns the data to the label decoding system 14. The method 500 then terminates at step 518.

If at step 512 the method determines that the destination address data was typed in by the operator, the method goes to step 516 to validate the typed-in data. Those skilled in the art will appreciate that the error correction routine may be carried out at the image display workstation where the data was entered, at the image server after the data was returned from the image display workstation, or at a separate validation computer connected to the image server via the network.

Those skilled in the art will appreciate that the validation process of step 516 determines whether the keyed in address matches a valid address from the database. If not, the method also attempts to correct common key entry mistakes in order to see if the corrected key entered data matches one of the addresses from the database. The validation/correction process is similar to the correction process described in conjunction with step 430 of FIG. 4, but is optimized for common key entry errors, which include substituting keys that are close together on the keyboard or letters that are transposed by the operator. The correction can be carried out by attempting to match a valid address from any address in the ZIP+4 database, or by trying to match one of the few close addresses transferred to the image display workstation from the label decoding system.

After the manually entered destination address data is validated, the method proceeds to step 514 and returns the correct destination address to the image server 29, which returns the data to the label decoding system 14. The method 500 then terminates at step 518.

From the foregoing description, it will be appreciated that the present invention provides an efficient system and method for reading package information. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Similarly, the method of the present invention may conveniently be implemented in program modules that are based upon the flow charts in FIGS. 3–5. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for reading package information from a package, said package information including machine-readable first information indicia and alphanumeric second information indicia, comprising the steps of:

capturing an image of said package, said image including said machine-readable first information indicia and said alphanumeric second information indicia;

locating said machine-readable first information indicia in said image;

automatically decoding said machine-readable first information indicia to provide package identification data;

locating said alphanumeric second information indicia;

automatically decoding said alphanumeric second information indicia to provide package destination data;

combining at least a portion of said package identification data and at least a portion of said package destination data to form a unified package record; and affixing third information indicia to said package, said third information indicia being machine readable and comprising said unified package record.

2. A method for reading package information as recited in claim 1, further comprising the step of storing said unified package record in a database.

3. A method for reading package information as recited in claim 1, further comprising the steps of:

determining whether said package destination data is valid;

displaying said image on a workstation; and receiving manually entered package destination data, and wherein said unified package record comprises said package identification data and said manually entered package destination data.

4. A method for reading package information as recited in claim 3, wherein said manually entered package destination data comprises a destination address selected from a list of possible destination addresses displayed on said workstation.

5. A method for reading package information as recited in claim 1, wherein locating said alphanumeric second information indicia comprises the steps of:

identifying a mark indicative of the location of said alphanumeric second information indicia; and using said mark to locate said alphanumeric second information indicia.

6. A method for reading package information as recited in claim 5, further comprising the step of rotating said alphanumeric second information indicia.

7. A system for reading package information from a package, said package information including machine-readable first information indicia and alphanumeric second information indicia, comprising:

an imaging system including a camera for capturing an image of said package;

a label decoding system for processing said image; and a printer for printing a label to be affixed to said package;

said label decoding system being programmed to:

locate said machine-readable first information indicia in said image;

decode said machine-readable first information indicia to provide package identification data;

locate said alphanumeric second information indicia;

decode said alphanumeric second information indicia to provide package destination data; and combine said package identification data and said package destination data to form a machine readable unified package record for printing on said label.

8. A system for reading package information as recited in claim 7, wherein said label decoding system is further programmed to store said unified package record in a database.

9. A system for reading package information as recited in claim 7, further comprising an image display workstation for displaying at least a portion of said image and for receiving manually entered data corresponding to said alphanumeric second information indicia, and wherein said label decoding system is further programmed to:

determine whether said package destination data is valid;

display said image on said workstation; and receive manually entered package destination data, and wherein said unified package record comprises said package identification data and said manually entered package destination data.

10. A system for reading package information as recited in claim 7, wherein locating said alphanumeric second information indicia comprises:

identifying a mark indicative of the location of said alphanumeric second information indicia; and using said mark to locate said alphanumeric second information indicia.

* * * * *